Nov. 27, 1962 P. DORNIER 3,065,928
MULTIPLE DRIVE FOR AIRCRAFT HAVING WINGS PROVIDED
WITH TRANSVERSE FLOW BLOWERS
Filed July 10, 1961

Inventor:
PETER DORNIER.
By K. A. Mayr
Attorney.

United States Patent Office 3,065,928
Patented Nov. 27, 1962

3,065,928
MULTIPLE DRIVE FOR AIRCRAFT HAVING WINGS PROVIDED WITH TRANSVERSE FLOW BLOWERS
Peter Dornier, Friedrichshafen, Germany, assignor to Dornier-Werke G.m.b.H., Friedrichshafen, Germany, a firm of Germany
Filed July 10, 1961, Ser. No. 122,683
Claims priority, application Germany July 16, 1960
1 Claim. (Cl. 244—10)

The invention relates to aircraft using transverse flow blowers for providing lift and/or forward thrust and more particularly to the arrangement of a plurality of blowers and drives therefor in aircraft of the aforesaid type.

The transverse flow blowers used in connection with the invention are conventional. They are cylindrical fans whose oblong blades are arranged on the circumference of a cylinder parallel to the longitudinal axis of the cylinder which axis is the rotation axis of the fan. The blades are so shaped that air is sucked from a portion of the circumference of the cylinder between the blades into the interior of the cylinder and is subsequently accelerated a second time by the blades of the same fan rotor and thereby thrown out of the cylinder in radial direction at a different part of its circumference.

Airplanes are known within the wings or fuselage of which transverse flow blowers are placed whereby the axes of rotation of the blowers extend substantially in the direction of the wingspread. The air enters the fans through suitable openings at the upper side of the wings and leaves the fans through suitable openings at the underside of the wings or fuselage. In this way the boundary layer at the top of the wings is sucked off and the lift coefficient is increased. The fans may also be used for producing forward thrust. Transverse flow blowers are also used for providing lift in wingless aircraft of the amphibious type and in so-called air cushion aircraft which are adapted to hover at low altitudes above the ground and which may be started on the air cushion instead of on an undercarriage. An aircraft of the last mentioned type is disclosed in my copending application Serial No. 121,-126, filed June 30, 1961.

An aircraft has been proposed having a delta-wing near the trailing edge of which a plurality of coaxial transverse flow blowers are provided. The driving motors are located at the rear tips of the wing and their rotation axes are in line with the rotation axes of the blower or blowers driven by the respective motor. Placement of motors in the tip or corner of a wing calls for a very complicated structure. Failure of an individual drive of a blower or a group of blowers causes a moment around the vertical axis of the aircraft which must be counteracted and which considerably impairs the flying conditions.

It is an object of the invention to provide, in an aircraft using transverse flow blowers for producing or improving lift and/or forward thrust on either side of the fuselage, a multiple drive for the blowers whereby the effect of the blowers on either side of the fuselage remains equal even upon failure of one or more drives. This object is obtained by providing a common shaft for the blowers which shaft is driven by a plurality of drives which are independent of each other and by arranging the blowers in the wings of the aircraft symmetrically at either side of the aircraft with the rotation axes of the blowers substantially parallel to the direction of the wingspread.

A further object of the invention resides in the provision of means, in aircraft using transverse flow blowers for producing or improving lift and/or forward thrust, for maintaining the rotational speed of the blowers constant at varying operating conditions without adjusting the position of the blades in the blower rotor. According to the invention the rate of flow of the air through the blowers is controlled in response to the rotational speed of the blowers. This may be done by controlling the inlet flow area and/or the outlet flow area of the blowers and/or flow control means within the blowers. The flow area control means of the blowers at either side of the aircraft are preferably rigidly interconnected and are adjusted by a conventional speed governor which is driven by a common shaft driving all blowers. In this way the flow and control conditions on either side of the aircraft are symmetric. Since the flow area control means are preferably formed by flaps rockably connected to the stationary wings and the speed governor is also mounted on a stationary part of the aircraft, the control is extremely simple and reliable.

The novel features which are considered characteristic of the invention are set forth with particularity in the appended claims. The invention itself, however, and additional objects and advantages thereof will best be understood from the following description of embodiments thereof when read in connection with the accompanying drawing wherein:

Figure 1:
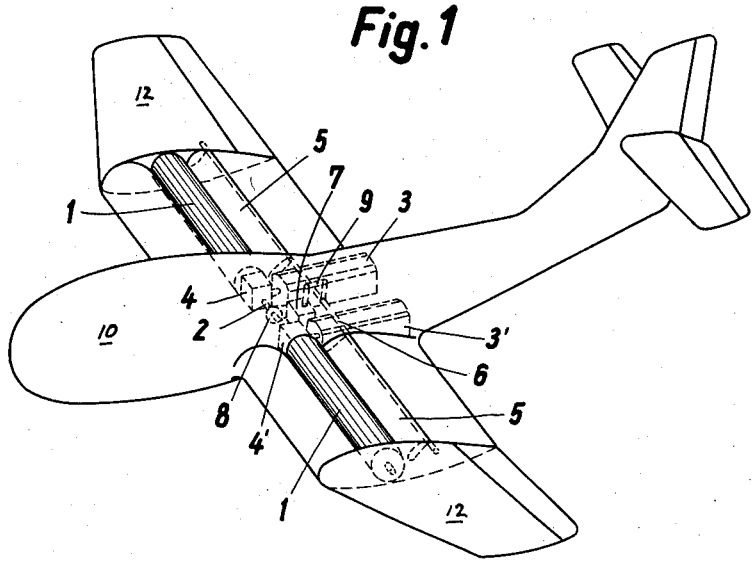
FIG. 1 is a diagrammatic perspective view of an aircraft equipped according to the invention.
Figure 2:
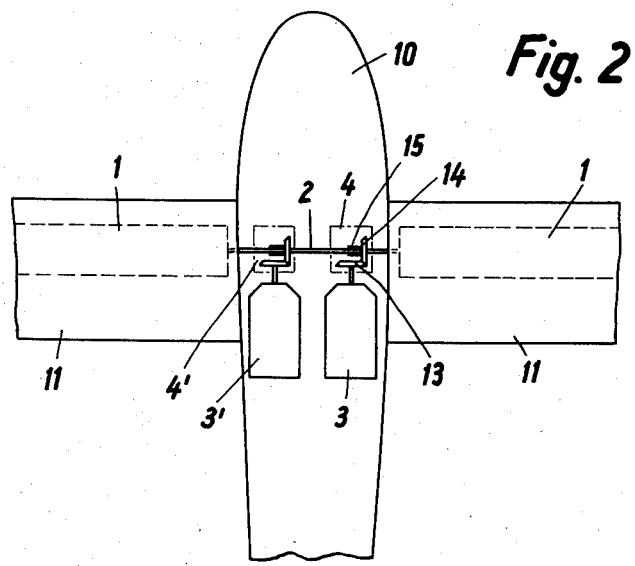
FIG. 2 is a diagrammatic plan view of the aircraft shown in FIG. 1.

Referring more particularly to the drawing, numeral 10 designates a fuselage to which central wing portions 11 are connected. Wing portions 12 extending from the outer ends of the portions 11 and shown only in FIG. 1 have a trapezoidal configuration. They are preferably arranged in the conventional V-position and provided with ailerons. No undercarriage is shown because this does not form part of the invention. The aircraft may be of a type, for example, as shown in my copending application Serial No. 121,126, filed June 30, 1961, and adapted to start and land on an air cushion.

A transverse flow blower 1 is placed in each of the central wing portions 11, the rotation axis of the blower extending substantially in the direction of the wingspread. The blowers suck air from the upper surfaces of the wings and discharge the air at the bottom surfaces of the wings. Depending on the direction of the exhaust air, which is controlled by means not forming part of the present invention and not shown, lift and/or forward thrust is produced. The transverse flow blowers may extend partly into the fuselage. Both blowers are arranged on a common shaft 2. Two motors 3 and 3' are provided for driving the blowers. The motors drive the shaft 2 by means of gears 4 and 4', respectively. Each gear comprises a driving bevel gear 13 and a driven bevel gear 14. A conventional freewheeling device 15 is interposed between each driven bevel gear and the shaft 2.

The aforedescribed arrangement facilitates installation of the blowers in the wings and affords utilization of substantially the entire length of the wings by the blowers, since the motors are placed in the fuselage. A satisfactory efficiency of the blowers can, therefore, be obtained. Installation of the motors in the fuselage is also quite simple. If one of the motors or transmissions fails, no unsymmetric thrust and no harmful moment around the vertical axis of the aircraft is produced. The respective freewheeling device disconnects the failing motor from the shaft 2 whereupon the blowers on either side of the fuselage continue to be equally driven by the motor which is still in operation. The total thrust is thereby not reduced to one half, but, due to the reduced specific work of the fan blades, the thrust is still approximately two thirds of the total producible thrust.

The arrangement according to the invention permits stopping of one motor while the aircraft is in flight and to continue flying with only one motor. This is particularly important when using turbines for driving the shaft 2. Throttling of the turbines is avoided and fuel consumption is reduced, because the one turbine which is in operation works at optimal efficiency.

A further advantage of the arrangement according to the invention is that not only if a motor fails but also if one of the transmissions fails, for example due to breakage of a bevel gear, the blowers on either side of the fuselage operate in the same manner.

The output of the drive or drives is fully absorbed by the transverse flow blowers 1 at low as well as at high flying speed. To obtain optimal operation of the driving motors or turbines the speed of rotation of the common drive shaft should be as constant as possible. As seen in FIG. 1, flaps 5 are provided adjacent to the intake openings of the blowers which flaps permit an increase or decrease of the inlet areas. Thus a larger inlet area can be provided for low flying speed and the inlet area can be reduced for high flying speed.

Any suitable device for controlling the intake openings of the blowers may be provided for altering the intake areas of or the rate of air flow through the blowers. Flaps may be provided which are slidable or rockable, as are the flaps 5 shown in the drawing. If desired, the control means may be located at the outlet openings of the blowers. The guide vanes forming part of conventional transverse flow blowers may be made adjustable for controlling the output of the blowers without changing the speed thereof.

In the illustrated embodiment of the invention the flaps 5 are mechanically rigidly interconnected. They extend from a common shaft 6. A conventional speed-responsive governor 7 is provided which is driven by the shaft 2 through drive means 8. The governor is operatively connected to the shaft 6 by connecting means 9 for adjusting the position of the flaps 5 in response to the speed of the shaft 2. With the aforedescribed mechanism the flaps 5 on either side of the fuselage are simultaneously and equally adjusted and the rotational speed of the shaft 2 is either maintained constant or within predetermined limits. The arrangement automatically produces in a simple manner symmetric flow and control conditions on either side of the longitudinal center line of the aircraft and automatically maintains the speed of the shaft 2.

The invention is not limited to the arrangement of two motors. More than two motors may be provided and individually connected in the described manner to the common drive shaft of the blowers. More than one blower may be placed in each wing, whereby the rotation axes of the blowers are preferably substantially parallel and/or parallel to the leading or the trailing edge of the wing. In this case the air outlet openings of the blowers are preferably arranged close to the leading edge or to the trailing edge of the wing. Two drive shafts for the blowers are provided which shafts extend throughout the wingspread and may be individually driven by a plurality of motors in the manner described before.

Instead of driving the shafts separately, the shafts of the blowers located within one wing may be coupled by a common drive and the drives of the shafts on either side of the aircraft may be interconnected by a common drive shaft which is driven in the aforedescribed manner by a plurality of motors. In this case the speed governor is preferably connected to the common shaft for the two drives and the air-flow control devices for all blowers are interconnected and connected to the speed governor to be simultaneously and equally adjusted thereby.

I claim:

Multiple drive for aircraft having wings extending laterally in opposite directions from the longitudinal axis of the aircraft and a transverse flow blower built into each wing for producing lift and/or forward thrust, comprising a common shaft for said blowers extending in the direction of the wingspread, a plurality of individual motors, a plurality of separate and independent transmissions individually interconnecting said individual motors and said shaft, air-flow control means placed adjacent to said blowers for controlling the rate of flow of air through said blowers, said air-flow control means being interconnected for simultaneous and equal actuation thereof, and actuating means for adjusting said air-flow control means, said actuating means comprising a speed governor connected to said shaft to be driven thereby for actuating said air-flow control means in response to the rotational speed of said shaft.

References Cited in the file of this patent

UNITED STATES PATENTS

| 1,133,984 | McCarley | Mar. 30, 1915 |
| 2,272,664 | Gropler | Feb. 10, 1942 |
| 2,973,167 | Lake | Feb. 28, 1961 |

FOREIGN PATENTS

| 1,040,907 | Germany | Oct. 9, 1958 |